(12) United States Patent
Hartman

(10) Patent No.: US 7,118,341 B2
(45) Date of Patent: Oct. 10, 2006

(54) SELF ADJUSTING SAIL VERTICAL SHAFT WINDMILL

(76) Inventor: Delbert Lee Hartman, #68 Juniper Hills Rd., Edgewood, NM (US) 87015

( * ) Notice: Subject to any disclaimer, the term of this patent is extended or adjusted under 35 U.S.C. 154(b) by 0 days.

(21) Appl. No.: 10/792,634

(22) Filed: Mar. 4, 2004

(65) Prior Publication Data
US 2005/0196279 A1    Sep. 8, 2005

(51) Int. Cl.
*F03D 3/06* (2006.01)
(52) U.S. Cl. .......................... 416/17; 416/41; 416/117; 415/4.2
(58) Field of Classification Search ................ 416/117, 416/132 B, 17, 41, 142, DIG. 4, 118; 415/4.2
See application file for complete search history.

(56) References Cited

U.S. PATENT DOCUMENTS

| 188,139 | A | * | 3/1877 | Howland et al. ............ 416/117 |
| 1,516,668 | A | * | 11/1924 | Burch ..................... 416/132 B |
| 2,397,346 | A | * | 3/1946 | Ramos ........................ 416/113 |
| 4,048,947 | A | * | 9/1977 | Sicard ......................... 416/240 |
| 5,083,902 | A | * | 1/1992 | Rhodes .................... 416/132 B |

* cited by examiner

Primary Examiner—Richard A. Edgar

(57) ABSTRACT

A vertical shaft is provided and supported whereupon are mounted sails that can so self adjust as to interact with the wind in such a way as to power a windmill as well as relieve themselves from winds that are too severe while maintaining continuous operation.

6 Claims, 1 Drawing Sheet

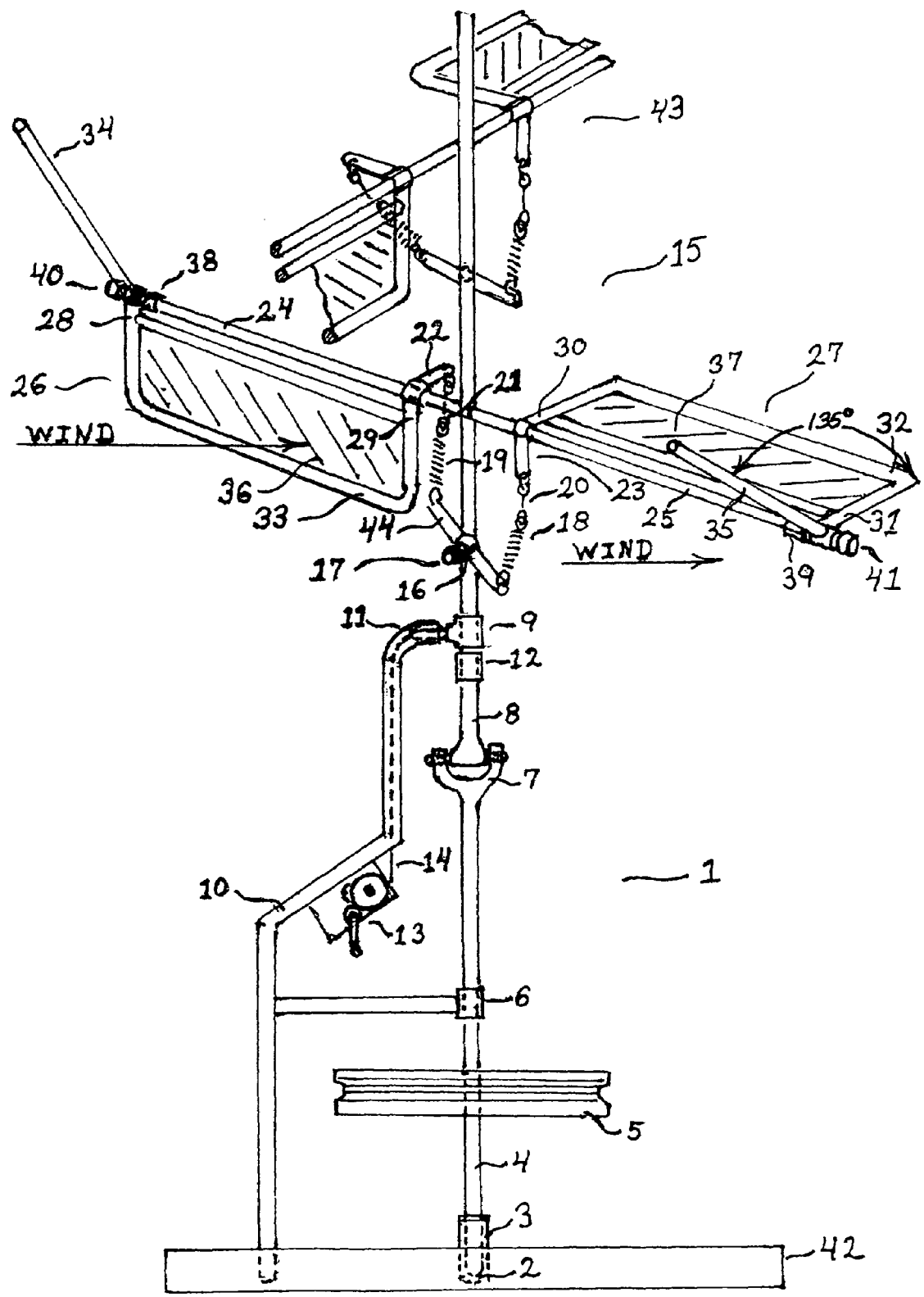

SELF ADJUSTING SAIL VERTICAL SHAFT WINDMILL

BACKGROUND OF THE INVENTION

This invention relates to a windmill of the vertical shaft type, which uses a self-adjusting sail or sails to catch the wind on one side of the mill and the same self adjusting design of the sail or sails to reduce the profile of the sail or sails and thus the resistance on the opposite side of the mill to near zero. The mill is designed to catch low velocity wind efficiently, turn at relatively low speed, and produce high torque, as well as be able to relieve itself from winds that are too severe. The only other windmills of similar design that I am aware of are wind speed indicators and wind turbines designed as vents. These are vertical shaft windmills of a fixed design. These former designs have too much reverse resistance, require too much material for construction, and are unable to relieve themselves from winds that are too severe.

BRIEF SUMMARY OF THE INVENTION

The invention relates to a vertical shaft windmill, having a self-adjusting sail or sails, the object of which is to provide a windmill that can catch low to moderately strong winds more efficiently, to provide a mill whose external parts move relatively slow, thus avoiding any fast moving parts aloft, both to reduce risk as well as construction cost, and to put any equipment driven by the mill on the ground where it can be easily serviced.

BRIEF DESCRIPTION OF THE DRAWING

Only one drawing is provided as I believe this to be adequate for understanding the invention.
DRAWING-1 (is a side elevation view of the windmill)

DETAILED DESCRIPTION OF THE INVENTION

Referring now specifically to the drawings. The numeral (1) refers to the Self Adjusting Sail Vertical Shaft Windmill. The windmill (1) includes a base (42) of some substantial material, concrete, steel, etc., a pivot bearing (2) and a lubricant housing (3), a lower vertical shaft (4), a drive pulley/flywheel (5), a lower support and bearing arm (6), and a flex joint (7) for raising or lowering the upper part of the windmill (1). The upper part of the windmill (1) includes an upper vertical shaft (8) and an upper support and bearing arm (9). The upper support and bearing arm (9) also serve as a connect to the tower (10). The upper support and bearing arm (9) are brought into alignment with the tower side of the connect (11), by placing a stop (12) on the vertical shaft (8), at the appropriate height. The upper part of the windmill (1) is raised and lowered by use of a winch (13) and cable (14). Above the upper support and bearing arm (9) are mounted sets of sail assemblies (15). Since any number of sail assemblies such as (15) may be included in the construction of the windmill (1), only one set will be drawn and numbered in detail, although at least three sets such as (15) are recommended. Also, additional sets such as (43) are placed at different heights, so that one sail does not block wind to another. The sail assembly (15) consists of a rocker arm bearing shaft (16) and a retainer cap (17). The rocker arm bearing shaft (16) protrudes perpendicular from the upper vertical shaft (8) at the appropriate height and degree. Upon the rocker arm bearing shaft (16) is mounted the rocker arm (44). To the rocker arm (44) are attached the safety springs (18) and (19), hence to the connecting cables (20) and (21), which in turn are connected to the positioning bars (22) and (23). Above the rocker arm bearing shaft (16), at an appropriate height are mounted two sail bearing shafts (24) and (25), protruding perpendicular from the upper vertical shaft (8), and set directly opposite of one another. Mounted on the sail bearing shafts (24) and (25) are two sails (26) and (27), in such a way as to hinge or swing. The sails (26) and (27) consist of four hinge arms, (28), (29), (30), and (31), two sail frames (32) and (33), two balance bars (34) and (35), two positioning bars (22) and (23), and two sail sheets (36) and (37), of an appropriate material, metal, plastic, etc. The sails (26) and (27) are held in position on the sail. bearing shafts (24) and (25) by use of two stops (38) and (39) and two retainer caps (40) and (41). As the wind comes against any side of the windmill (1), it causes a sail or sails, such as (26), on the side of the windmill (1), to come broadside to the wind, at the same time the opposite sail or sails, such as (27), is lifted, causing its profile to the wind to diminish. The force of the wind, being only on one side of the windmill (1) causes it to turn, hence the drive pulley/flywheel (5). Power can then be transmitted from the drive pulley/flywheel (5) to any appropriate receiver. The positioning bars (22) and (23), the two cables (20) and (21), the two springs (18) and (19), and the rocker arm (44) are provided not only to position the sails (26) and (27), but in the event of too severe of a wind, to provide relief to those sails, such as (26), that are broadside to the wind, by stretching the springs (18) and (19), thus reducing the profile of the broadside sails, such as (26), to the wind. In the event that a spring, such as (18) or (19), or cable, such as (21) or (22), breaks, the broadside sail or sails, such as (26), can swing out of the wind.

What is claimed as new is as follows:

1. A vertical shaft windmill comprising: at least one pair of sails;
   wherein each sail is provided with a positioning bar set at a right angle to the downwind sides of the sail;
   wherein a rocker arm joins each pair of sails;
   wherein each positioning bar is coupled to the rocker arm by at least one spring.
2. The vertical shaft windmill of claim 1 further comprising a universal joint for raising or lowering the windmill.
3. The vertical shaft windmill of claim 1 further comprising a support and bearing arm for maintaining the windmill in a working position.
4. The vertical shaft windmill of claim 1 further comprising a means of raising or lowering the windmill.
5. The vertical shaft windmill of claim 1 wherein each sail has a bar extending from its outer end set exactly 135° from the front of each sail.
6. The vertical shaft windmill of claim 1 wherein each sail is so coupled to the windmill as to swing clear in the event that any of the coupling components break.

* * * * *